Dec. 4, 1923.

M. C. BAUMANN 1,476,438

AIRPLANE CONSTRUCTION

Filed Aug. 30, 1920    2 Sheets-Sheet 1

Dec. 4, 1923.

M. C. BAUMANN

AIRPLANE CONSTRUCTION

Filed Aug. 30, 1920  2 Sheets-Sheet 2

1,476,438

Witnesses
L. Hale Enrick
Spencer F. Hunt

Inventor
Milton C. Baumann
By Francis D. Hardesty
Attorney

Patented Dec. 4, 1923.

1,476,438

UNITED STATES PATENT OFFICE.

MILTON C. BAUMANN, OF DAYTON, OHIO, ASSIGNOR TO DAYTON-WRIGHT COMPANY, OF DAYTON, OHIO, A CORPORATION OF DELAWARE.

AIRPLANE CONSTRUCTION.

Application filed August 30, 1920. Serial No. 406,764.

*To all whom it may concern:*

Be it known that I, MILTON C. BAUMANN, a citizen of the United States of America, residing at Dayton, county of Montgomery, State of Ohio, have invented certain new and useful Improvements in Airplane Constructions, of which the following is a full, clear, and exact description.

The present invention relates to airplane structure and has among its objects the distribution and arrangement of the weight of the fuselage and the several units therein in such fashion as to more uniformly distribute it to the supporting surface.

Another object is to suspend the weight of the engine and other heavy units directly from the supporting plane or planes, instead of distributing this weight to the fuselage and then to the plane or planes as is ordinarily done.

Other objects and advantages of the present invention will be apparent from the following description, reference being had to the accompanying drawings, wherein a preferred form of embodiment of the present invention is clearly shown.

Figure 1:
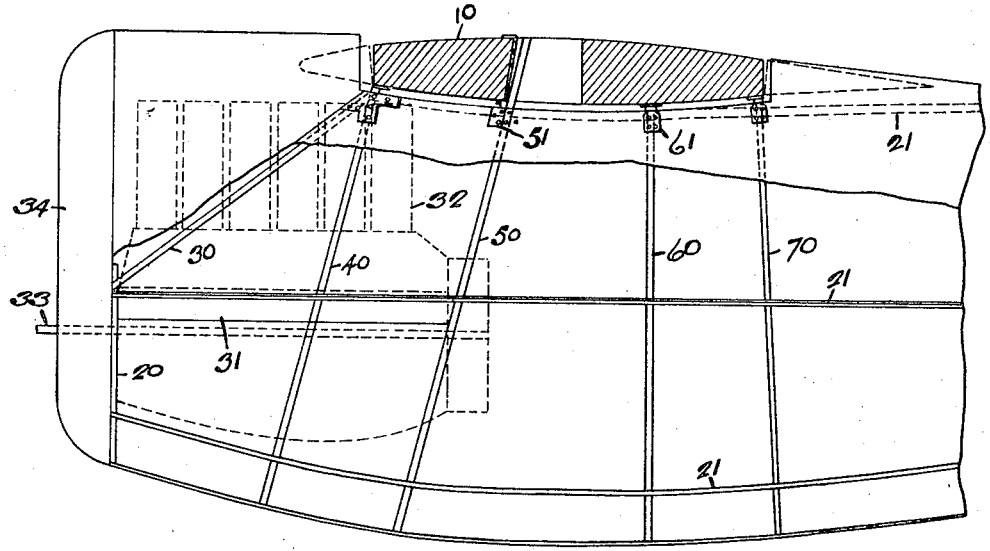
Fig. 1 is a side view of the front portion of the fuselage of a monoplane, with the plane in section and part of the shell of the fuselage broken away in order to show the internal structure.
Figure 2:
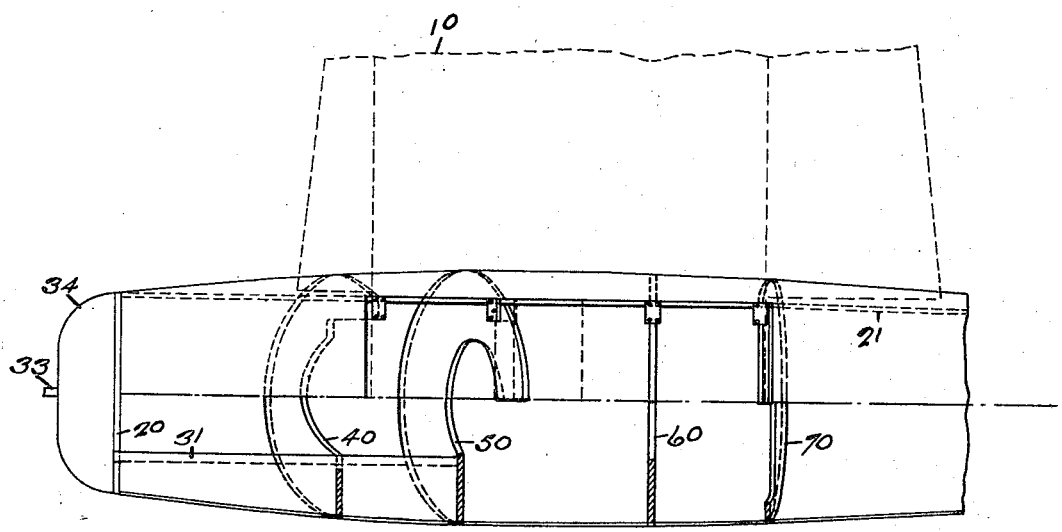
Fig. 2 is a top view of such a plane with the planes indicated by dotted lines and with one half of the fuselage and interior structure in horizontal section.
Figure 3:
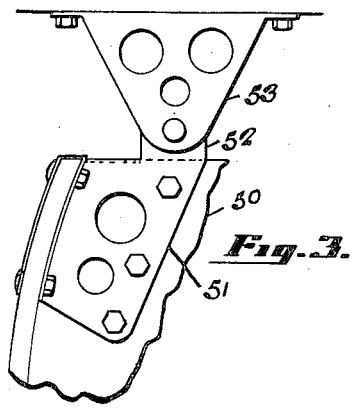
Fig. 3 is a front view of one of the metal hangers for attaching the bulkheads to the plane.
Figure 4:
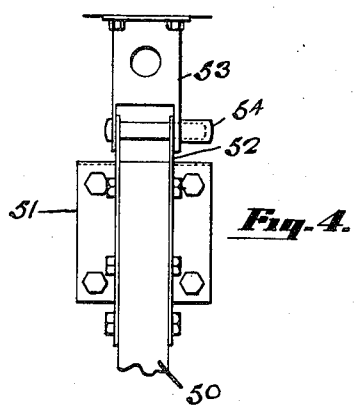
Fig. 4 is a side view of the hanger shown in Fig. 3.
Figure 5:
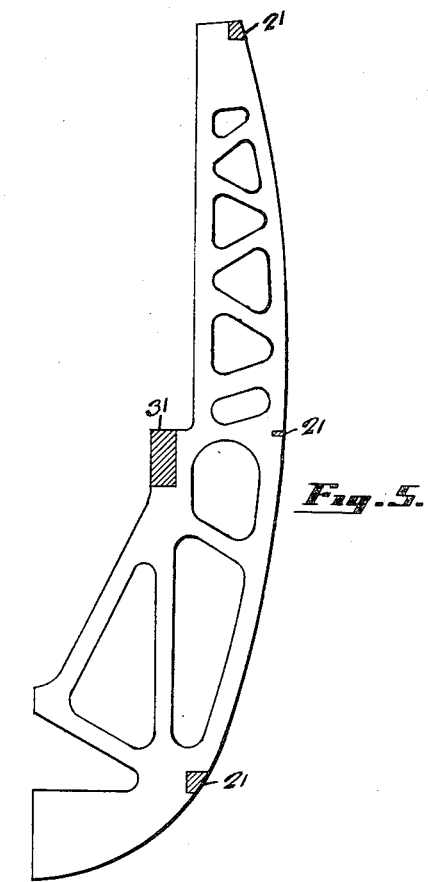
Fig. 5 illustrates one half of one of the bulkheads and Fig. 6 illustrates a portion of another bulkhead.
Figure 6:
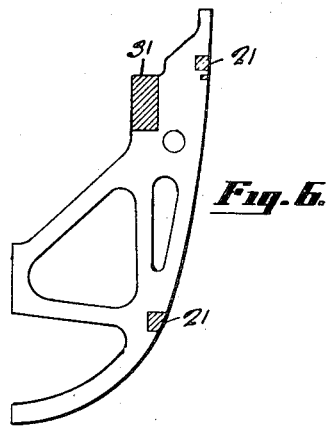

In the drawings, showing as indicated above, the preferred form of embodiment of the invention, the numeral 10 represents the supporting plane of the monoplane. From this plane is suspended the fuselage and the several units therein in the following manner:

The fuselage is built up upon a series of bulkheads represented by the numerals 20, 30, 40, 50, 60 and 70. In Figs. 5 and 6 are represented suitable forms of bulkheads such as have been found satisfactory for use in the positions illustrated in Fig. 1 by 40 and 20 respectively.

The shell of the fuselage is built up on these bulkheads and stiffened longitudinally by means of suitable ribs or longerons indicated at 21 in Figures 1, 5 and 6.

Bulkheads 20, 30, 40 and 50 serve to support longitudinal members 31 upon which rests the engine indicated conventionally at 32. The engine is provided with the usual propeller shaft projecting from the front end of the fuselage and indicated at 33, the numreal 34 indicating the radiator.

The space between bulkheads 50 and 60 and between bulkheads 60 and 70 may be utilized for the fuel tank and other units, which units may be supported from these bulkheads.

Immediately behind bulkhead 70 is the cockpit of the machine and this bulkhead also serves as an instrument board.

At or near its upper edge, each of the bulkheads except the one numbered 20 is provided with two or more plates indicated at 51 and 61, it being understood that all of the bulkheads are so equipped, which plates are provided with means for securely attaching them to the bulkheads and to the shell of the fuselage and which are also provided with an upwardly extending lug 52 for engagement with the corresponding lug 53, which latter is securely attached to the under surface of the plane. These cooperating lugs on the bulkhead and the plane are fastened together by suitable bolts 54 for suspending the fuselage and its contained units therefrom.

In the preferred form of embodiment of the invention the plane 10 is constituted in such fashion as to form a single unitary structure for both wings. This form of wing for convenience is designated herein as a "double wing." By this expression there is intended to be covered a wing which is made as a unit from tip to tip or which is made in halves and fastened together so as to form in effect a unit.

It will be noted that by the present structure all of the weight is supported directly from the middle portion of the wing or wings, it being understood that the structure can be applied to biplanes with only minor modification. This form of construction is clearly distinguishable from the construction in which the engine and other heavy units are supported indirectly through the distribution of the weight of such units to the fuselage.

It will thus be seen that by the present construction, the stresses have been placed upon the more rugged portions of the airplane rather than upon the more delicate structure such as the fuselage itself.

While the form of mechanism herein shown and described, constitutes a preferred form of embodiment of the present invention, it is to be understood that other forms might be adopted, all coming within the scope of the claims which follow:

1. In an airplane, a plurality of bulkheads, a fuselage built upon the bulkheads, the latter also furnishing support for the engine and other heavy units, and means for suspending the bulkheads from the middle portion of a double wing.

2. In an airplane, a plurality of bulkheads, longitudinal members attached to two or more of the forward bulkheads furnishing support for the engine, and means for directly suspending the bulkheads from the planes.

3. In an airplane, a main supporting aerofoil, a fuselage having bulkheads therein for supporting the engine, and means for attaching the bulkheads directly to the main aerofoil.

In testimony whereof I hereto affix my signature.

MILTON C. BAUMANN.

Witnesses:
ROBERT E. SMITH,
ALVINA LEHMAN.